June 8, 1965 J. E. LITVIN 3,187,488
FURNACE FILTER
Filed March 26, 1962 2 Sheets-Sheet 1
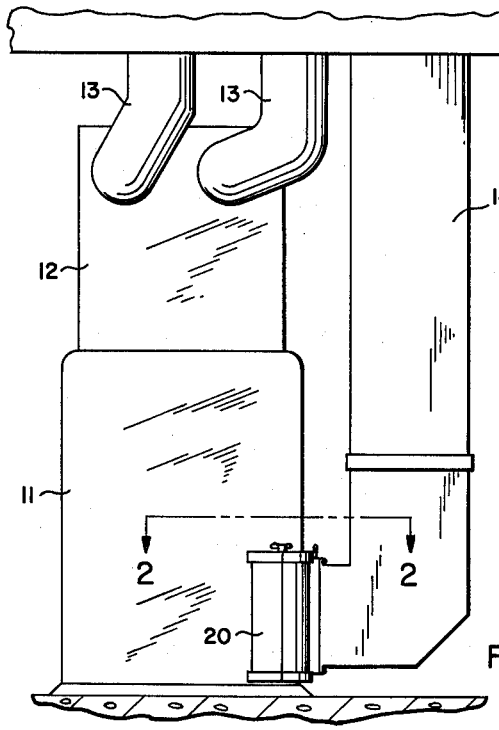
FIG.-1
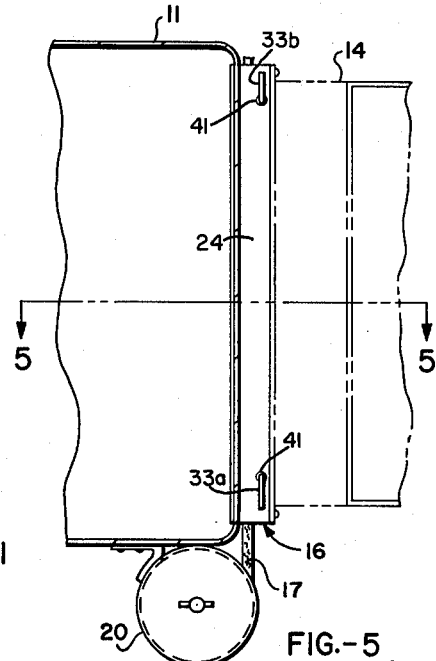
FIG.-2
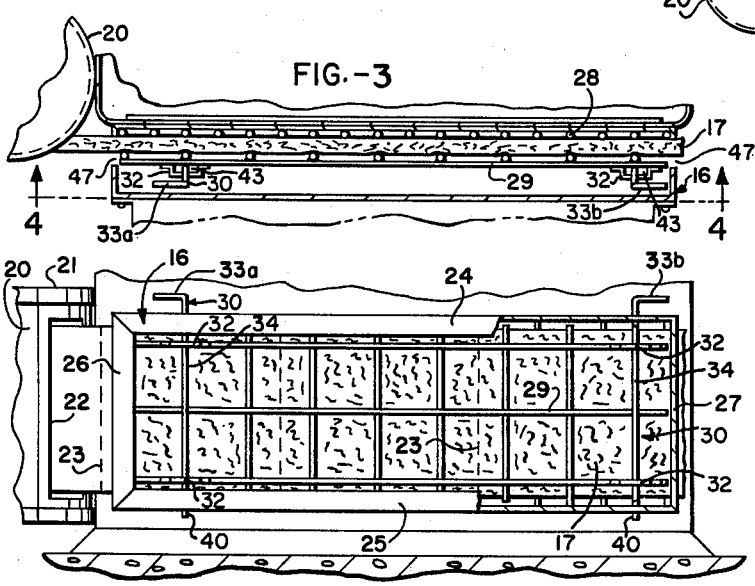
FIG.-3
FIG.-4
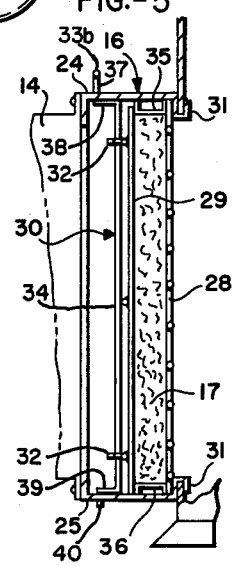
FIG.-5
INVENTOR.
JOHN EDWARD LITVIN
BY *Watts & Fisher*
ATTORNEY June 8, 1965  J. E. LITVIN  3,187,488
FURNACE FILTER Filed March 26, 1962  2 Sheets-Sheet 2

INVENTOR.
JOHN EDWARD LITVIN
BY Watts & Fisher

ATTORNEYS

United States Patent Office 3,187,488
Patented June 8, 1965

3,187,488
FURNACE FILTER
John Edward Litvin, 7515 McLellan Drive,
Walton Hills, Ohio
Filed Mar. 26, 1962, Ser. No. 182,341
3 Claims. (Cl. 55—493)

The present invention relates generally to filters and more specifically to disposable filters which are used in conjunction with a central heating and/or cooling unit to clean and condition the air circulated throughout the associated building.

The filter of the invention is particularly suitable for use with furnaces which directly heat or otherwise condition the air circulated through the inhabited portions of the building. In such furnaces a filter is generally provided at an inlet air opening to clean the cold air drawn into the heat exchanger compartment of the furnace. A problem with these filters is that they should be cleaned and changed regularly in order to maintain effective dust control and efficient operation of the furnace. Where the furnace is only used for heating during the winter season the filter should be changed preferably monthly and at least two or three times during that heating season.

Now that air conditioning units are being combined with forced air furnaces to provide a unit capable of providing year round comfort for the home owner, the filters used with these modern heating and conditioning units should be changed regularly throughout the year to provide good dust control. However, for one reason or another, the average home owner rarely changes the furnace filter once a year at the beginning of the heating season, let alone several times a year. Some of the factors affecting a regular change of filters are the inconvenience of buying and storing several filters, as well as, the more human aspect of just plain remembering that such a remotely located and rarely visited object as the furnace should have its filter changed periodically.

A typical filter construction used in conjunction with furnaces is a rectangular layer of spun glass material sandwiched between two reinforcing screens. A cardboard frame surrounds the perimeter of the sandwiched filter material and screens, binding them together, in a rigid filter unit. This filter unit is fixed to the furnace by sliding it into a guide structure attached to the furnace at the air inlet opening. These filters are relatively expensive and bulky, require frequent cleaning and periodic replacement. They often present a storage problem because new and used filters are apt to become wet and/or dirty during storage in many basements. Accordingly, replacement of a worn out filter is often deferred because the home-owner does not wish to store spare filters.

The listed and other disadvantages of prior arrangements are overcome by the filter of this invention. In the filter and supporting structure of the invention the filter material is supplied transversely across the furnace air inlet opening in a continuous form. The filter material is rolled and stored in a canister attached to the side of the furnace adjacent the air inlet opening. A slot-like opening is provided in the side of the canister to permit the filter material to be withdrawn therefrom. The invention also contemplates that a filter guide and supporting structure be attached to the furnace at the air inlet opening. As the filter material is withdrawn from the canister it extends into and between the filter guides. The filter supporting structure includes a stationary screen which is provided at the inside surface of the filter to reinforce the filter material and to prevent it from being drawn into the furnace. A second screen is provided on the outside of the filter material to also reinforce the filter. The outer screen is movable to permit the filter material to be facilely drawn from between the supporting screens for replacing the used portion of the filter with a clean portion.

An immediate advantage of the filter structure of the invention is the cost savings. Providing only filter material in a continuous roll eliminates the need of the metal screens and a cardboard frame for each individual filter. Thus, in the filter structure of the present invention only the filter material itself is thrown away. Another advantage is that with a ready supply of filter material on hand, the home owner is always assured that an additional filter is ready and immediately available to replace the dirty filter in use and only a few minutes' time is required to change the filter.

Of no less importance is the convenience of having to buy the supply of filter material only at very infrequent intervals and not having to provide a special place for their storage until they are to be used. Moreover, there is no danger that the filter material will be misplaced, soiled, or crushed during storage.

Accordingly, an object of the present invention is to provide a new and improved filter which is easily changeable and is storable in a readily accessible position for facile and instantaneous filter changes.

Another object of this invention is to provide a substantially continuous filter supply for use in conjunction with a furnace.

Yet another object of this invention is to provide a new and improved furnace filter which is readily disposable.

A further object of this invention is to provide a new and improved filter which is supplied to the furnace air inlet opening in a continuous form so that the used portion of the filter is replaced with a clean new portion as the used portion is drawn away from the air inlet opening and which used portion is then easily removed from the continuous filter supply.

Still another object of this invention is to provide a new and improved filter structure using a continuous supply of filter material and which fixedly maintains the filter material transversely across the air passageway and permits a used, dirty portion of filter material to be facilely withdrawn from the air passageway so as to bring a new, clean portion thereacross.

Other objects and a fuller understanding of the invention may be had by referring to the following description and claims taken in conjunction with the accompanying drawings in which:

FIGURE 1 is an elevational view of a furnace using the filter supporting structure of the invention;

FIGURE 2 is an enlarged, sectional view taken along line 2—2 of FIGURE 1;

FIGURE 3 is an enlarged view, with parts removed and shown in section, of the filter guide structure of the present invention;

FIGURE 4 is a sectional view, with portions removed, taken along line 4—4 of FIGURE 3;

FIGURE 5 is an enlarged, elevational view taken along line 5—5 of FIGURE 2; and, FIGURE 6 is an enlarged fragmentary view shown in perspective, of the filter support structure of the present invention.

Figure 6:
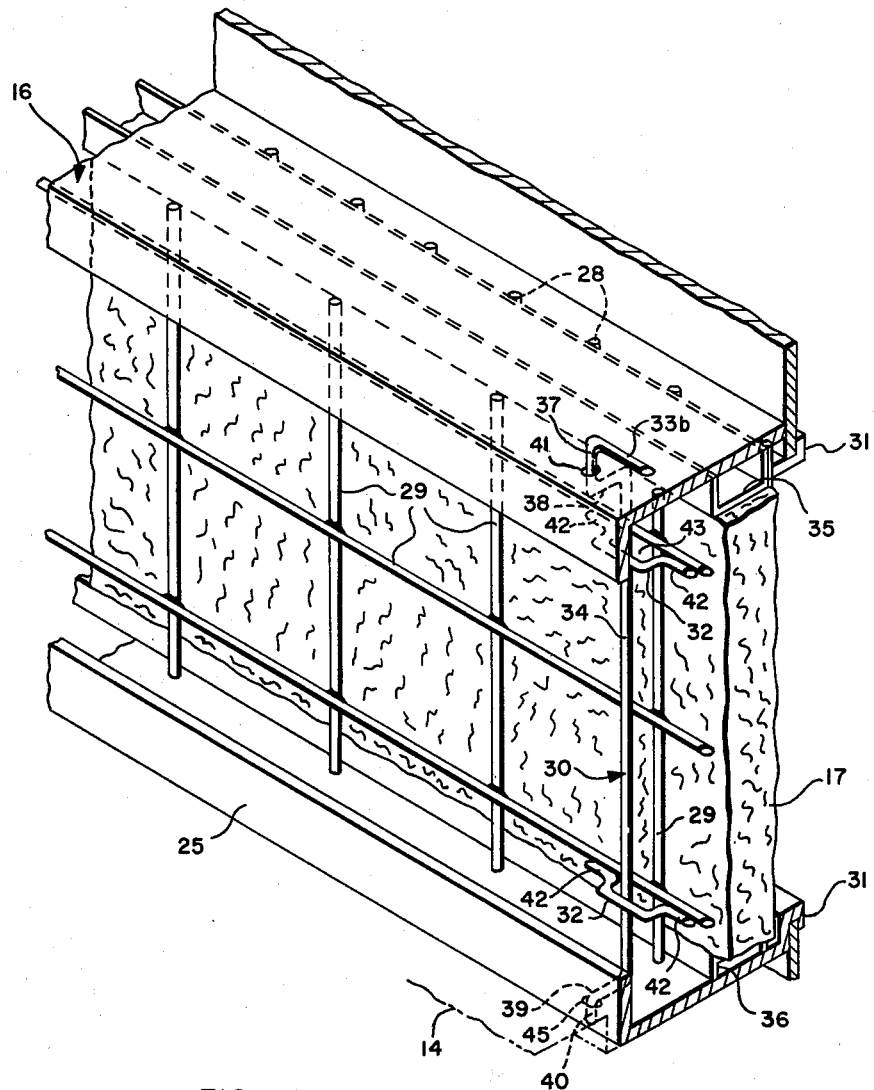

Referring now to the drawings, wherein like reference characters designate like or corresponding parts throughout the several views (which illustrate a preferred embodiment), there is shown in FIGURE 1 a forced air furnace 11.

The forced air furnace 11 includes a plenum 12 and hot air ducts 13 which distribute the heated air throughout the house or building. A cold air return 14 directs the cold air collected from the building into the heat exchanger compartment of the furnace 11 through an air inlet opening in one wall of the furnace. A filter guide and support structure, indicated generally by the reference character 16 in FIGURES 2–6, is provided at the inlet opening for supporting a filter 17 transversely across the opening. The filter 17 is part or section of a roll of filter material which is stored in a canister 20 attached to a side of the furnace adjacent the filter guide and support structure. The canister 20 is provided with a removable lid 21 for inserting the rolls of filter material. A slot-like opening 22 is provided in a side of the canister 20 to permit the filter material to be withdrawn from the canister in a continuous, substantially linear sheet. The canister is attached to the side of the furnace so that the opening 22 is orientated to permit the filter material to be withdrawn so as to extend through the filter guide in a straight line, tangent to the edge of the roll.

The filter 17 is made of any suitable material; for example, spun glass. The roll of filter material is preferably perforated (indicated by reference character 23) crosswise to its lengthwise dimension at lengths corresponding to approximately the size of the air inlet opening and thus forms a plurality of filter sections. When it is time to change the filter the used, dirty section is pulled through the filter guide until an unused section transversely covers the air inlet opening. The used section is removed from the roll by cutting the filter material or by tearing the filter material along the perforated line if such perforations are provided.

The filter guide and support structure 16 is provided with top and bottom channel-like guide members, 24 and 25 respectively, and a pair of side channel-like guide members 26, 27. The four channel-like guide members are fixed together to form a frame-like housing around the air inlet opening of the furnace. One flange of each of the channel-like members 24–27 is secured to the furnace wall by the crimp shown in FIGURE 3 or by any other suitable construction. The other flange is secured to the cold air return 14. A portion of the back or web of each side channel-like member is slotted longitudinally to provide openings 47 to permit the filter material 17 to pass through the guide structure.

The filter guide 16 is also provided with a stationary inner screen 28 for retaining the filter material in a planar position and to prevent it from being drawn into the interior of the furnace. A movable outer screen 29 is provided to also retain the filter in a planar position and to facilitate replacement of the used, dirty filter with a clean, unused portion. The screens 28, 29 are shown as a welded grid-work of round bars (exaggerated in size for purposes of illustration) but may take other suitable forms.

A pair of lever rods 30 having off-set portions 34 are provided to enable the home owner to move the outer movable screen 29 away from the inner stationary 28 to facilitate replacing the filter. The top of the lever rods 30 are bent to form handles 33a, 33b. The rods 30 each include a first shaft portion 37, a first transverse portion 38, the off-set portion 34, a second transverse portion 39, and a second shaft portion 40. The first shaft portions 37 extend through apertures 41 in the top channel-like member 24 and between their respective handles 33a, 33b and the first transverse portions 38. The first transverse portions 38 extend between the first shaft portions 37 and the off-set portions 34. The second transverse portions 39 extend between the off-set portions 34 and the second shaft portions 40. The second shaft portions 40 are aligned with the first shaft portions 37 and extend through apertures 45 in the bottom channel-like member 25. In the sectional view of FIGURE 3, the rods 30 are shown in their entirety and not in cross-section for purposes of clarity of illustration. Thus, the rods 30 are rotatably mounted in the top and bottom channel-like members 24, 25. The off-set portions 34 of the rods 30 are slidably attached to the movable screen 29 by brackets 32 so as to form lost motion connections. The brackets 32 are U-shaped members having flanges 42 attached to the movable screen 29 as by welding. The off-set portions 34 are disposed in slot-like openings 43 defined by the brackets 32 and the movable screen 29. Rotation of the handles 33a, 33b rotates the shaft portions 37, 40 in the apertures in the top and bottom channel-like members 24, 25. Rotation of the shaft portions 37, 40 moves the off-set portions 34 in an arc around the shaft portions 37, 40 so that the off-set portions 34 engage the sides of the slot-like openings 43 and move the movable screen 29 between a first position supporting and holding the filter material 17 against the stationary screen as is shown in FIGURES 3, 5, and a second position further away from the stationary screen 28 releasing the filter material 17 so as to permit the facile withdrawal of the filter material 17. Simultaneous angular rotation of the handles 33a, 33b causes substantial parallel displacement of the outer movable screen 29 from the inner stationary screen 28.

A pair of guide and stop channels 35, 36 are fixed to the inside of the webs of the top and bottom channel-like members 24, 25 respectively, to vertically position the filter transversely across the air inlet opening. The channels 35, 36 also act as a stop to limit the inward relative movement of the outer screen and to prevent excessive crushing of the filter material. The off-set portions 34 of the lever rods 30 are sized to exert sufficient pressure on the movable screen 29 to cause it to bow slightly when the rods are in the full clamping center position, shown in FIGURE 5. The pressure of the lever rods against the screen and that of the screen against the channel stops 35, 36 places all the movable parts in tension and prevents them from rattling when the furnace is in operation. In some instances it may be desirable to use smaller stop channels 35, 36, to modify them, or even eliminate them entirely so that the movable screen 29 may be used to clamp the perforated area of the filter material against the inner screen and the filter support to facilitate tearing away the used, dirty filter section. In such case only the handle 33b is rotated so that only the perforated portion of the filter material is crushed. If only the handle 33b is rotated then it is apparent that the movable screen 29 will move angularly relative to the stationary screen 28 rather than parallel to it as when both handles 33a, 33b are simultaneously rotated. Crushing or squeezing the filter material in this manner assures a uniform tear along the perforated line.

Although the specification describes the invention in detail it is believed to comprise essentially a heating and/or cooling unit having an air inlet opening, a filter guide and support structure attached to the unit at the opening, and a roll of filter material of a length several times the size of the air inlet opening being supported adjacent the guide structure and unrollably extending through the filter guide structure to transversely cover the air inlet opening so as to filter all air passing therethrough.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A filter adapted to be attached to a wall having a fluid inlet opening to effect the removal of dust and the like from fluid passing through the opening, comprising:
   (a) a filter support structure including filter guide members arranged in a spaced relation to define an air passageway therethrough, said guide members also defining a filter receiving opening on one side of said passageway and a filter removal opening on the other side of said passageway;
   (b) a roll of filter material supported adjacent said support structure and including an unrolled section slidably carried by said guide members so as to extend transversely across said passageway, said unrolled filter section entering said guide members through said receiving opening and being withdrawable from said guide members through said removal opening;
(c) screen means extending transversely across said passageway to maintain said unrolled section of filter material transversely across said air passageway, said screen means including a stationary screen and a movable screen in spaced relation so as to define a filter compartment extending from the filter receiving opening on one side of the air passageway to the filter removal opening on the other side of the air passageway;
(d) said movable screen being movable between first and second positions relative to and parallel to said stationary screen, said movable screen in said first position being in spaced relation to said stationary screen and sandwiching a filter section against the stationary screen sufficiently to hold the filter section against the stationary screen but not to the extent of appreciably crushing any portion of the filter section, said movable screen in its second position being further spaced from said stationary screen and releasing said filter section so that said filter material facilely slides through said compartment in said guide members; and,
(e) a pair of lever arms each having shaft portions and portions off-set from said shaft portions, said shaft portions being rotatably carried by said filter support structure, the off-set portions of the lever arms engaging the screen at spaced locations so that rotation of both lever arms moves the movable screen in a parallel manner relative to said stationary screen and rotation of one of said arms moves the movable screen angularly relative to said stationary screen.

2. A filter adapted to be attached to a wall having a fluid inlet opening to effect the removal of dust and the like from fluid passing through the opening, comprising:
(a) a filter support structure including filter guide members arranged in a spaced relation to define an air passageway therethrough, said guide members also defining a filter receiving opening on one side of said passageway and a filter removal opening on the other side of said passageway;
(b) a roll of filter material supported adjacent said support structure and including an unrolled section slidably carried by said guide members so as to extend transversely across said passageway, said unrolled filter section entering said guide members through said receiving opening and being withdrawable from said guide members through said removal opening;
(c) screen means extending transversely across said passageway to maintain said unrolled section of filter material transversely across said air passageway, said first and second screens being arranged in spaced relation one on each side of said guide members so as to define a filter compartment extending from the filter receiving opening on one side of the air passageway to the filter removal opening on the other side of the air passageway;
(d) said guide members including screen stop portions interposed between said first and second screens, one of said screens being movable relative to the guide members between a first position abutting the screen stop portions and a second position away from the screen stop portions;
(e) said screen stop portions as interposed between said screens being sized to maintain said screens in spaced relation sandwiching a filter section between them sufficiently to support the filter section but not to the extent of appreciably crushing any portion of the filter section when the movable screen is abutting the screen stop portions;
(f) said movable screen when in said second position away from the screen stop portions being spaced from the screen stop portions and being further spaced from the other screen so as to release the filter section and permit the filter material to slide facilely in said guide members and through the filter compartment; and,
(g) handle means carried by said filter support structure and connected to the movable screen for selectively moving the latter screen between said first and second positions.

3. The device of claim 2 wherein the guide members having the screen stop portions comprise a pair of elongated members disposed in parallel relation horizontally, across the top and bottom sides of the passageway between said screens, said elongated members being vertically spaced to closely receive the filter material when the filter material is maintained upright and disposed across said opening, and said elongated members having a width nearly the thickness of the filter material.

References Cited by the Examiner

UNITED STATES PATENTS

| | | | |
|---|---|---|---|
| 1,868,278 | 7/32 | Denison | 55—354 |
| 2,522,568 | 9/50 | Dahlman | 55—354 |
| 2,722,993 | 11/55 | Gerber et al. | 55—354 |
| 2,763,139 | 9/56 | Callan et al. | 55—354 |
| 2,963,112 | 12/60 | Cawthon et al. | 55—352 |
| 3,117,849 | 1/64 | Selke | 55—354 |

HARRY B. THORNTON, *Primary Examiner.*